United States Patent [19]

Inoue et al.

[11] 4,427,087

[45] Jan. 24, 1984

[54] MOTORCYCLE PROVIDED WITH AN ENGINE HAVING A SUPERCHARGER

[75] Inventors: Kazuo Inoue, Tokyo; Tsuneo Otsuka, Wako, both of Japan

[73] Assignee: Hondo Giken Kogyo Kabushiki Kaisha, Tokyo, Japan

[21] Appl. No.: 339,471

[22] Filed: Jan. 15, 1982

[30] Foreign Application Priority Data

| | | | |
|---|---|---|---|
| Jan. 14, 1981 | [JP] | Japan | 56-4369 |
| Jan. 14, 1981 | [JP] | Japan | 56-4370 |
| Jan. 21, 1981 | [JP] | Japan | 56-7357 |
| Jan. 27, 1981 | [JP] | Japan | 56-10354 |

[51] Int. Cl.³ .......................... B62D 61/02; F02B 37/00

[52] U.S. Cl. .......................... 180/219; 60/598; 60/605; 123/559

[58] Field of Search .................. 180/219; 60/598, 605, 60/613; 123/559

[56] References Cited

U.S. PATENT DOCUMENTS

| | | | |
|---|---|---|---|
| 3,521,904 | 7/1970 | Sheffer | 180/219 |
| 3,726,084 | 4/1973 | Meier et al. | 60/605 |

FOREIGN PATENT DOCUMENTS

| | | | |
|---|---|---|---|
| 862702 | 1/1940 | France | 123/559 |
| 54-118907 | 9/1979 | Japan | 60/605 |

*Primary Examiner*—Joseph F. Peters, Jr.
*Assistant Examiner*—Kenneth R. Rice
*Attorney, Agent, or Firm*—Armstrong, Nikaido, Marmelstein & Kubovcik

[57] ABSTRACT

A motorcycle provided with an engine having a supercharger wherein the engine integrally formed with an engine body and a transmission case is mounted on a body frame, said transmission case having an upper case and a lower case integrally connected with each other, which are separable into upper and lower portions, and a supercharger for compressing suction air of said engine is mounted on the rear surface of said transmission case.

5 Claims, 7 Drawing Figures

MOTORCYCLE PROVIDED WITH AN ENGINE HAVING A SUPERCHARGER

BACKGROUND OF THE INVENTION

The present invention relates to a motorcycle provided with an engine having a supercharger which compresses suction air of the engine to enhance the filling efficiency thereby increasing the output thereof.

SUMMARY OF THE INVENTION

It is an object of the present invention to provide a motorcycle of the kind described which can enhance the cooling property of a supercharger heated to a high temperature and prevent the supercharger in an exposed state from being interfered with other parts.

It is a further object of the present invention to provide a motorcycle of the kind described in which a supercharger is mounted on a body frame without hindering the mounting and operation of existing devices.

It is another object of the present invention to provide a motorcycle of the kind described in which a supercharger is mounted at a position as low as possible to prevent the raise of gravity of the vehicle resulting from the provision of the supercharger while the connection of an exhaust pipe to the outer periphery of a turbine housing of the supercharger will not lower the minimum level of the vehicle from the ground.

The above and other objects, features and advantages of the present invention will become apparent from the following detailed description of a few preferred embodiments when taken in conjunction with the accompanying drawings.

BRIEF DESCRIPTION OF THE DRAWINGS

FIGS. 1 and 2 illustrate a first embodiment of the present invention, in which FIG. 1 is a general side elevation of a motorcycle provided with an engine having a supercharger, and FIG. 2 is a schematic sectional view of the engine of FIG. 1;

FIGS. 4 and 5 illustrate a third embodiment of the present invention, in which FIG. 4 is a view similar to FIG. 1, and FIG. 5 is a schematic plan view of an engine having a supercharger; and FIGS. 6 and 7 illustrate a fourth embodiment of the present invention, in which FIG. 6 is a view similar to FIG. 1, and FIG. 7 is a view similar to FIG. 5.

DESCRIPTION OF THE PREFERRED EMBODIMENTS

Figure 1:
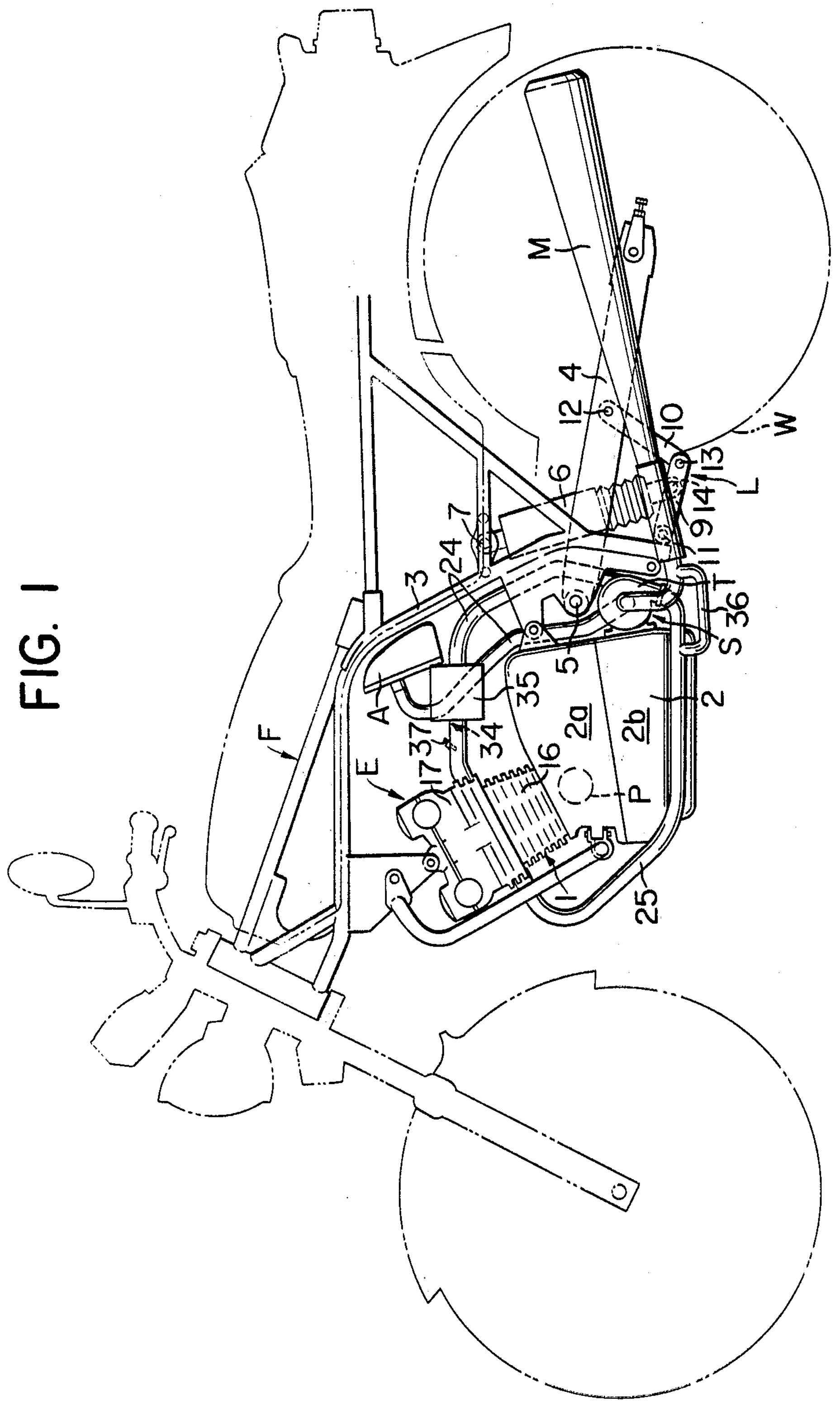

In the following, some embodiments of the present invention will be described in conjunction with the attached drawings, and in which description and drawings, same reference numerals are given to the similar or corresponding elements.

Figure 2:
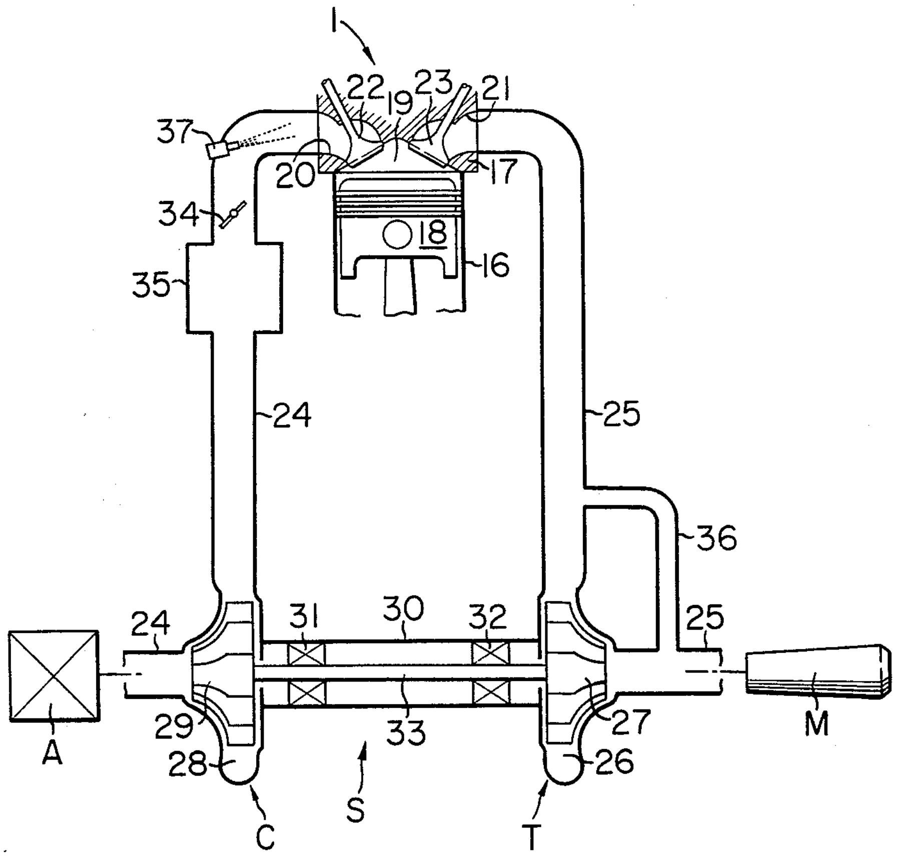

First, FIGS. 1 and 2 illustrate a first embodiment. In FIG. 1, suspended and supported on a body frame F of a motorcycle is an engine E integrally formed with an engine body 1 and a transmission case 2. The transmission case 2 includes an upper case 2*a* and a lower case 2*b* separated into upper and lower portions which are integrally connected with each other, and a turbo-supercharger S is mounted on the rear surface of the lower case 2*b*.

Above the turbo-supercharger S, the forward end of a rear fork 4 is pivotally connected at 5 to a center tube 3 of the body frame F for upward and downward swinging movement, and a rear wheel W is rotatably supported on the rear end of the rear fork in a conventional manner.

A rear damper 6 suspended at 7 from the body frame F for lateral swinging movement has a lower end connected to the rear fork 4 through a link mechanism L. The link mechanism L is designed so that free ends of a first link 9 pivotally mounted at 11 at one end to the lower end of the body frame F and a second link 10 pivotally mounted at 12 at one end to a middle portion of the rear fork 4 are rotatably connected with each other at 13. The rear damper 6 has the lower end connected at 14 to the middle portion of the first link 9. In the link mechanism L, as the rear fork 4 swings upwardly, that is, as the rear wheel W moves upwardly, the rate of increase in flexure amount of the rear damper 6 increases and that flexure amount relative to the upward movement amount of the rear wheel W changes in a curve-like fashion.

Next, the structure of the engine E provided with the aforementioned turbo-supercharger S will be explained principally referring to FIG. 2. The engine body 1 conventionally comprises a cylinder block 16 slidably receiving therein a piston 18 and a cylinder head 17 secured thereon. The cylinder head 17 and piston 18 constitute a combustion chamber 19 to which is open at a suction port 20 and an exhaust port 21 which ports 20 and 21 are alternately opened and closed by means of a suction valve 22 and an exhaust valve 23.

The suction port 20 and exhaust port 21 have their respective outer ends connected to a suction passage 24 and an exhaust passage 25, between which passages is provided the turbo-supercharger S. This turbo-supercharger S comprises a turbine T provided in the midst of the exhaust passage 25 and a compressor C provided in the midst of the suction passage 24. The turbine T is constructed such that a turbine disc 27 is accommodated within a turbine chamber 26 formed in the midst of the exhaust passage 25. The compressor C is constructed such that a compressor disc 29 is accommodated within a compressor chamber 28 provided in the midst of the suction passage 24. The turbine chamber 26 and the compressor chamber 28 are integrally connected by means of a bearing holder 30. The turbine disc 27 and the compressor disc 29 are connected for integral rotation by means of a rotary shaft 33 supported within the bearing holder 30 through bearings 31 and 32.

The suction passage 24 has a fuel jet nozzle 37 mounted adjacent to the suction port 20, a throttle valve 34 is mounted on the upstream side of the jet nozzle, and a prechamber 35 provided on the upstream side of the throttle valve 34 and formed by enlarging a sectional area of a part of the suction passage 24.

The exhaust passage 25 has a waste gate 36 which by-passes the turbine T, and a flow of exhaust gas from the engine E is partly permitted to be escaped into the waste gate 36 so that inlet pressure of the turbine T may be adjusted.

An air cleaner A is connected to the inlet of the suction passage 24, and a muffler M is connected to the outlet of the exhaust passage 25.

The exhaust gas discharged from the combustion chamber 19 to the exhaust passage 25 during the exhaust stroke of the engine E principally passes through the turbine T to impart exhaust energy to the turbine disc 27. This causes the turbine disc 27 to rotate to drive the compressor disc 29 through the rotary shaft 33, and therefore, air sucked into the suction passage 24 from the air cleaner A is pressurized by the compressor C and fed to the prechamber 35. The sucked air is adjusted in flow rate by the throttle valve 34, thereafter mixed with injected fuel from the jet nozzle 37 and is fed to the combustion chamber 19 during the suction stroke of the engine E. In this manner, a high filling efficiency in air-fuel mixture may be obtained in the combustion chamber 19, and upon combustion of the mixture, the engine E provides a high output.

When pressure pulsations are brought forth within the suction passage 24 resulting from the intermittent operation of the suction valve 22 during engine operation, the pressure pulsations are damped by the prechamber 35 to prevent a surging phenomenon of the compressor C. In the drawings, reference character P designates an oil pump provided on the upper case 2*a*.

According to the aforementioned embodiment, the engine E integrally formed with the engine body 1 and the transmission case 2 is mounted on the body frame F, the transmission case 2 is composed of the upper case 2*a* and the lower case 2*b* separated into upper and lower portions integrally connected with each other, and the supercharger S is mounted on the lower case 2*b*. With this arrangement, even if the supercharger S is heated to a high temperature, such heat is promptly transmitted to the lower case 2*b* in which lubricating oil is stored as having a relatively low temperature, thus effectively cooling the supercharger S to prevent inconvenience due to the overheat thereof.

Moreover, if the supercharger S is attached to the rear surface of the lower case 2*b*, the fore part of the supercharger is protected by the engine so as not to interfere with obstacles from the front, during the running of the motorcycle, to be kept from damage.

Figure 3:
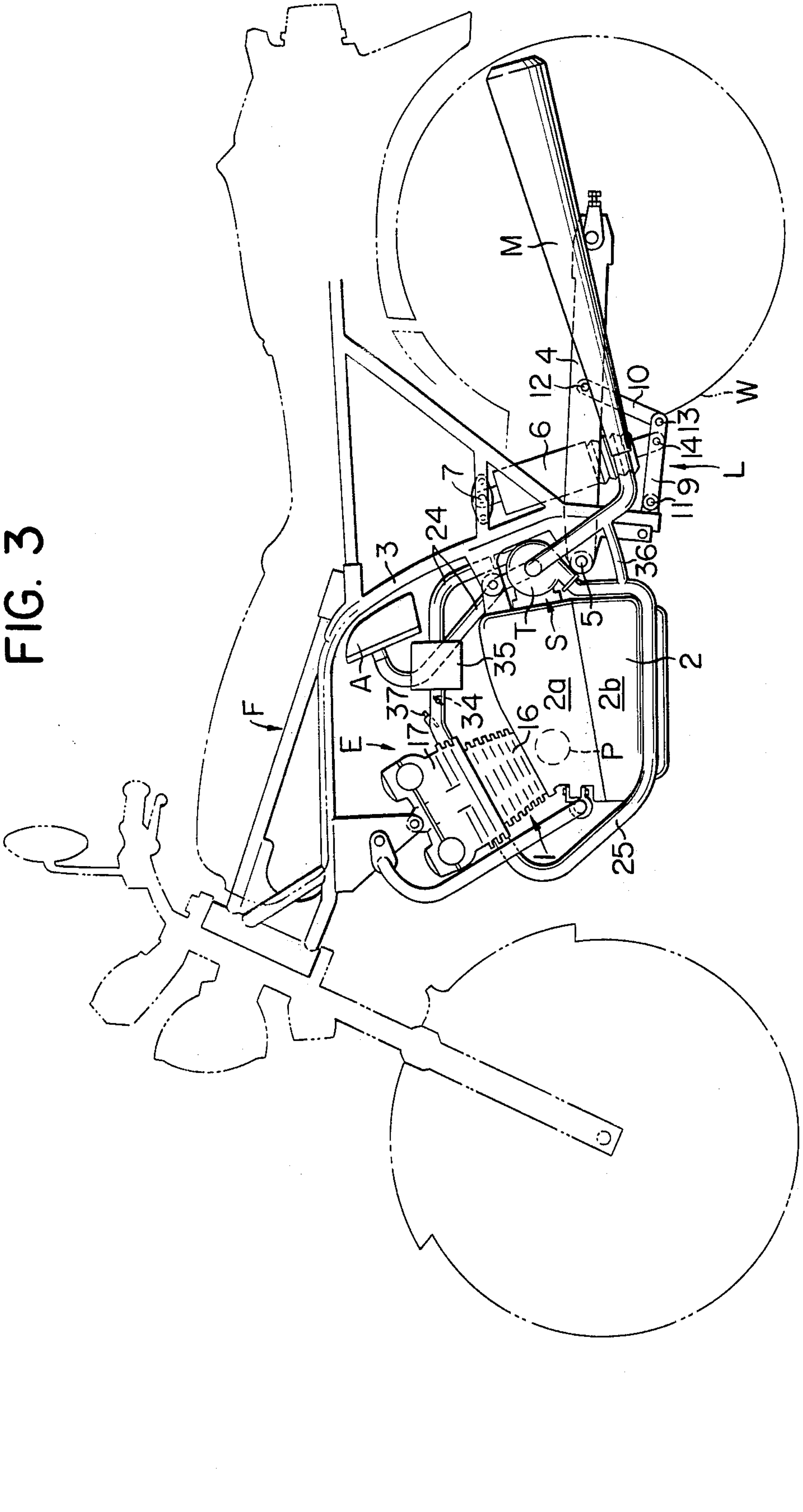
FIG. 3 is a view similar to FIG. 1, showing a second embodiment of the present invention.

FIG. 3 illustrates a second embodiment of the present invention. In this embodiment, the supercharger S is mounted on the rear surface of the upper case 2*b* of the transmission case 2, and the rear fork 4 rotatably supporting a rear wheel Wr is below the supercharger S and has its forward end pivotally supported at 5 on the body frame F for upward and downward swinging movement. Thus, the supercharger S is covered at its forward portion with the engine body and at its lower portion with the pivoted portion of the rear fork 4 so that during the running of the motorcycle, an obstacle coming from the front of the supercharger S is blocked by the engine body and an obstacle from the lower portion, that is, from the running surface blocked by the pivoted portion of the rear fork 4 to protect the supercharger S as a whole from any obstacles to prevent it from being damaged. The construction and operation of this embodiment other than those noted above are substantially similar to the aforementioned first embodiment.

Figure 4:
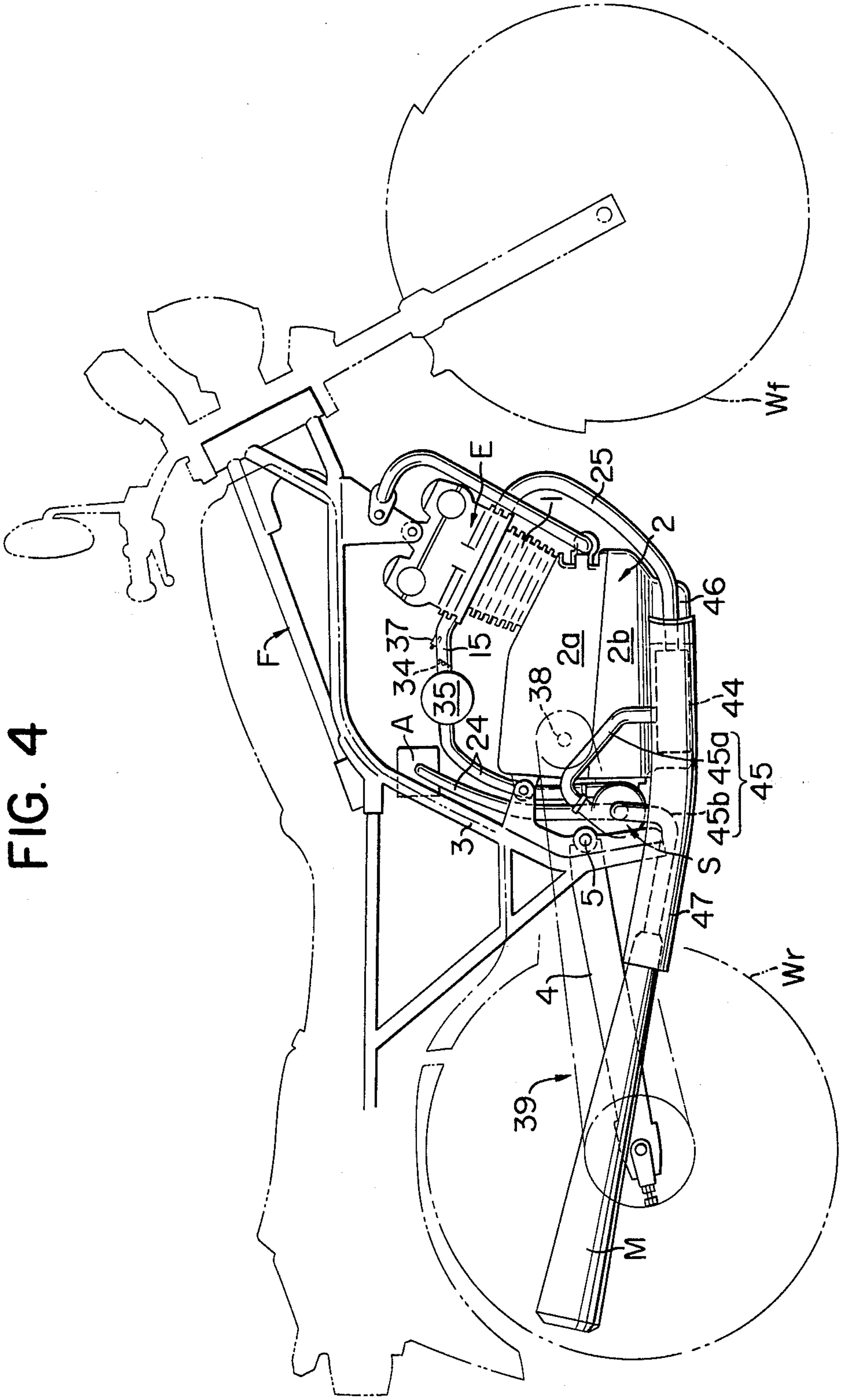
Figure 5:
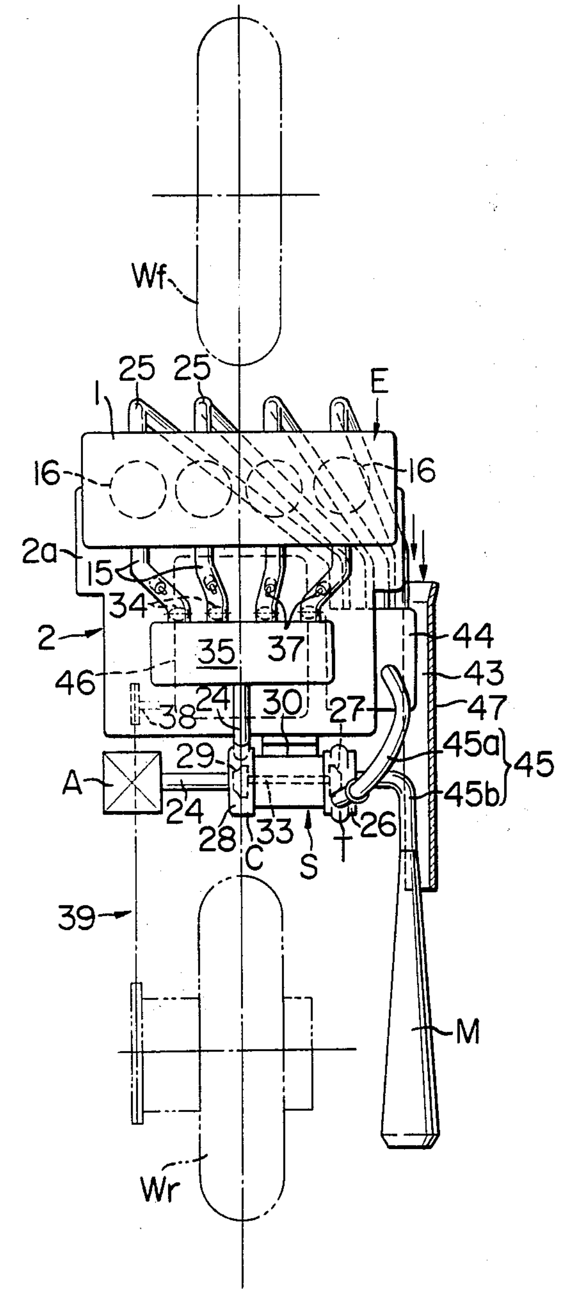

FIGS. 4 and 5 illustrate a third embodiment of the present invention.

In FIG. 4, the engine E provided with a crank case and transmission case 2 at the lower end of the engine block 1 substantially stood upright is suspended and supported on the body frame F of the motorcycle halfway between front and rear wheels Wf, Wr. The transmission case 2 includes an upper case 2*a* and a lower case 2*b* separated into upper and lower portions which are integrally connected with each other, and a turbo-supercharger S is mounted on the rear surface of the lower case 2*b*.

Above the turbo-supercharger S, the forward end of a rear fork 4 is pivotally connected at 5 to a center tube 3 of the body frame F for upward and downward swinging movement, and the rear wheel Wr is rotatably supported on the rear end of the rear fork in a conventional manner.

Next, the construction of the engine E with the turbo-supercharger S mounted thereon will be described with reference to FIGS. 4 and 5. The engine block 1 is formed with four cylinders 16, and corresponding to these cylinders 16, the engine block 1 has four independent suction pipes 15 connected to the rear surface thereof and four independent exhaust pipes 25 connected to the forward surface thereof, said independent suction pipes 15 each having a throttle valve 34 and a fuel jet nozzle 37 positioned at a downstream of said valve 34. The four independent suction pipes 15 have their respective upstream ends connected to the forward surface of a single prechamber 35 disposed above the transmission case 2, and the prechamber 35 is connected to an air cleaner A through a common suction pipe 24. Also, the four independent exhaust pipes 25 have their respective downstream ends connected to a single exhaust manifold box 44 disposed on one side of the lower portion of the engine E (on the right side of the lower portion of the transmission case 2 in FIG. 5). The exhaust manifold box 44 is connected to a muffler M disposed on one side of the rear wheel Wr through a common exhaust pipe 45, and the turbo-supercharger S is provided between the common exhaust pipe 45 and the common suction pipe 24.

The turbo-supercharger S comprises a turbine T disposed in the midst of the common exhaust pipe 45 and a compressor C disposed in the midst of the common suction pipe 24. The turbine T is designed to accommodate a turbine disc 27 within a turbine housing 26 formed in the midst of the common exhaust pipe 45 while the compressor C is designed to accommodate a compressor disc 29 within a compressor housing 28 formed in the midst of the common suction pipe 24. Both the housings 26 and 28 are integrally connected through the bearing holder 30, and both the discs 27 and 29 are integrally rotatably connected with each other through a rotary shaft 33 supported on the bearing holder 30.

In mounting the turbo-supercharger S on the transmission case 2, the turbine T and compressor C are disposed in a lateral direction of the vehicle, under which condition the bearing holder 30 is secured to the rear surface of the lower case 2*b* of the transmission case 2 so as to be deviated laterally from the center of the case 2 toward the exhaust manifold box 44, whereby the turbine T is placed in a position close to the outer surface of the transmission case 2 near the exhaust manifold box 44.

An upstream side half 45*a* of the common exhaust pipe 45 extending from the exhaust manifold box 44 to the turbine housing 26 rises from the upper surface of the exhaust manifold box 44 and is connected to the upper portion of the outer periphery of the turbine housing 26 from an upward oblique direction. A downstream side half 45*b* of the exhaust pipe 45 extending from the turbine housing 26 to the muffler M projects from the central part of the outer surface of the turbine housing 26 and extends substantially along the extended axis of the independent exhaust pipe 25 and is connected to the muffler M. A web-like style strip 47, which covers each of outer surfaces of the exhaust manifold box 44 and a part of the common exhaust pipe 45 with a vent gap 43 therebetween, is disposed extending from the rear end of the outermost independent exhaust pipe 25 to the forward end of the muffler M. The style strip 47 is fastened to the bracket (not shown) projectingly provided on the exhaust manifold box 44 and Muffler M. This style strip 47 has its forward end outwardly bended so as to facilitate introduction of running air into the vent gap 43.

During the operation of the engine E, power thereof is removed from an output shaft 38 of the transmission system to drive the rear wheel Wr through a chain transmission device 39 in a conventional manner. The chain transmission device 39 is disposed through the rear wheel Wr opposite the exhaust system such as the exhaust manifold box 44, turbine T and muffler M.

During the exhaust stroke of the engine E, exhaust gases discharged from the cylinders 16 into the independent exhaust pipes 25 are merged at the exhaust manifold box 44, after which the gases pass through the turbine T via the common exhaust pipe 45 to impart exhaust energy to the turbine disc 27. This causes the turbine disc 27 to rotate to drive the compressor disc 29 through the rotary shaft 33 whereby air sucked into the common suction pipe 24 from the air cleaner A is compressed by the compressor C and fed into the prechamber 35, from which the air is distributed into the independent suction pipes 15 and then adjusted in flow rate by the throttle valves 34, after which the air is mixed with jet fuel from the jet nozzle 37 and during the suction stroke of the engine E, is supplied to the cylinders 16. In this manner, the filling efficiency high in air-fuel mixture may be obtained in the cylinders 16 and by the combustion of the mixture the engine E exhibits a high output.

When, during the aforesaid operation, the intermittent operation of the suction valve causes pressure pulsations within the independent suction pipes 15, the pressure pulsations are damped by the prechamber 35 to prevent a surging phenomenon of the compressor C.

In the drawings, reference numeral 46 designates an oil pan integrally formed on the bottom of the transmission case 2.

In the above-mentioned embodiment, the exhaust manifold box 44 in communication with the plurality of independent exhaust pipes 25 associated with the cylinders 16 is disposed on the side of the engine block 1 and the common exhaust pipe 45 extended from the exhaust manifold box 44 is connected to the outer periphery of the turbine housing 26 of the turbo-supercharger S so that the exhaust gases from the cylinders 16 of the engine E are permitted to continuously act on the turbine T of the turbo-supercharger S through the exhaust manifold box 44 to drive the turbine in a well stabilized manner, as a consequence of which the filling effect of the cylinders 16 may be enhanced effectively.

Furthermore, the connected portion of the common exhaust pipe 45 extended from the exhaust manifold pipe 44 to the outer periphery of the turbine housing 26 is located above the housing 26 so that the turbo-supercharger S can be arranged at a sufficiently low level position around the lower portion of the vehicle without lowering a predetermined minimum height of the vehicle from the ground by the common exhaust pipe 45 to prevent the center of gravity of the vehicle from being raised by the turbo-supercharger S.

Figure 6:
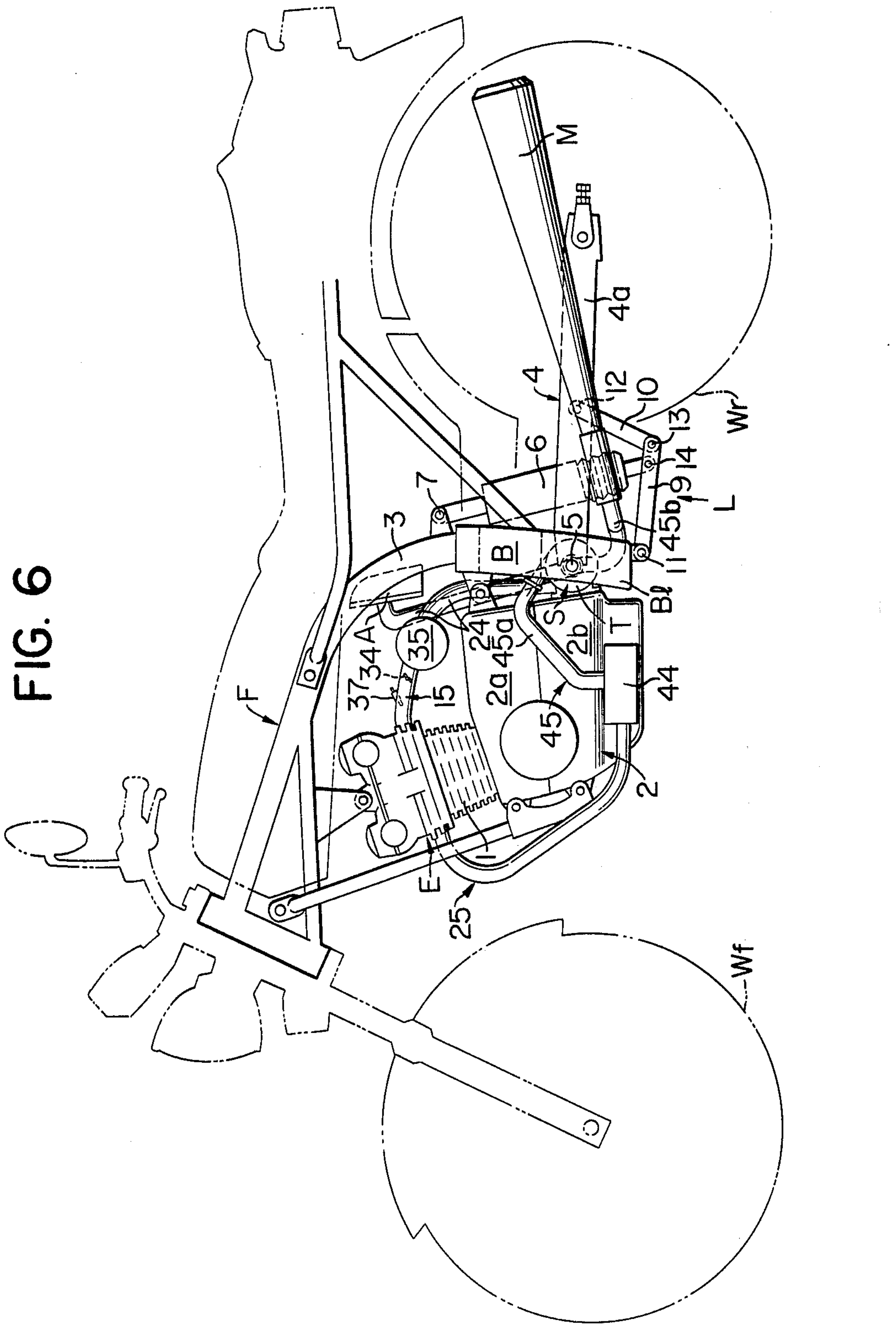
Figure 7:
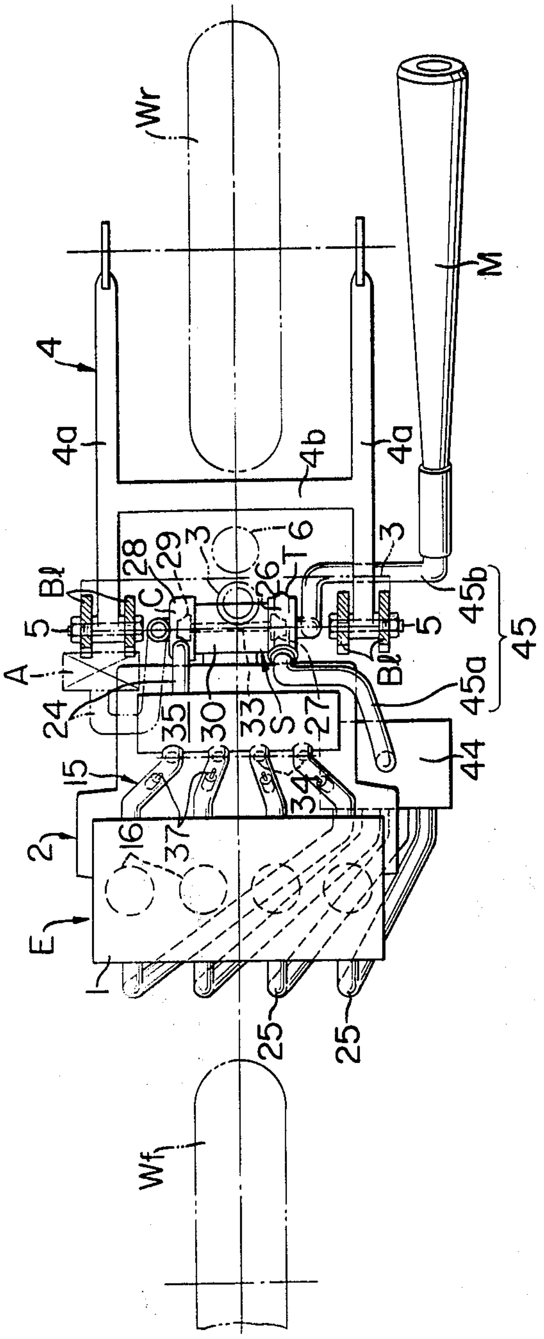

FIGS. 6 and 7 illustrate a fourth embodiment of the present invention.

In this embodiment, on the substantially same axis as of the turbo-supercharger S mounted on the rear surface of the lower case **2*b* of the transmission case 2, the rear fork 4 has a base end pivotally supported for upward and downward swinging movement through a pivot 5 on a support bracket B fixedly mounted on the lower end of a center tube 3** of the body frame F.

The above-mentioned structure will be further described in detail. The rear fork 4 is composed of a pair of fork legs **4*a* disposed on left and right sides of the rear wheel Wr, and a cross member 4*b* for integrally connecting these fork legs 4*a* immediately before the rear wheel Wr. On the other hand, the support bracket B is integrally provided with two pairs of support legs B1 which extend downwardly to sandwich the turbo-supercharger S between those paired legs, and between the pairs of support legs B1 are bridged and fastened the pivots 5 arranged on the substantially same axis as of the turbo-supercharger S. The paired pivots 5 pivotally support the base ends of both the fork legs 4*a* for upward and downward swinging movement. The rear wheel Wr is rotatably supported between the rear ends of both the fork legs 4*a*** in a conventional manner.

The lower end of the rear damper 6 pivotally supported at 7 for forward and rearward swinging motion on the body frame F is connected to the rear fork 4 through the link mechanism L in a manner similar to the case of the aforementioned first embodiment.

In accordance with this embodiment, the supercharger S for pressurizing suction air of the engine E is disposed at the rear of the engine body 1 and between the pair of fork legs **4*a*, and therefore, the forward portion of the supercharger S is protected by the engine body 1 and both the left and right sides thereof are protected by the pair of fork legs 4*a* so as not to interfere with obstacles from the front or side during the running of the motorcycle preventing the damage thereof. In addition, even if the pivot point 5 at the forward end of the rear fork 4 is brought to a position close to the center of gravity of the motorcycle, that is, to the engine body 1, the rear fork 4** will not interfere with the supercharger S.

Moreover, since the supercharger S is disposed between the paired pivots 5 of both the fork legs **4*a* of the rear fork 4, the supercharger S is not displaced from the position between both the fork legs 4*a* in any swinging position of the rear fork 4 to enhance the protective effect of the rear fork 4 with respect to the supercharger S and to avoid interference between the supercharger S and the pivots 5**.

The construction and operation of this embodiment other than those noted above is substantially similar to the case of the aforementioned third embodiment.

While the case in which a turbo-supercharger S is employed as a supercharger has been described in the above-described embodiments, it should of course be noted that any type of supercharger may be employed.

What is claimed is:

1. A motorcycle comprising a body frame; an engine mounted on said body frame, said engine having an engine body and a transmission case integral with and below said engine body; a rear fork having a pair of fork legs disposed on both left and right sides of a rear wheel and having a forward end pivotally mounted on said body frame to the rear of said engine body, for upward and downward swinging movement; and a supercharger mounted on the rear surface of said transmission case between said paired fork legs of the rear fork, said supercharger compressing air taken into said engine.

2. A motorcycle as set forth in claim 1, wherein said transmission case comprises an upper case and a lower case connected to each other in a separable manner as upper and lower portions, and wherein said supercharger is mounted on said lower case.

3. A motorcycle as set forth in claim 1, wherein said supercharger includes a turbine housing having a turbine disc therein, and wherein said engine comprises a cylinder block having a plurality of cylinders, a plurality of independent exhaust pipes each associated with corresponding ones of said cylinders, an exhaust manifold box positioned on the side of said cylinder block and communicating with said independent exhaust pipes, and a common exhaust pipe extending from said exhaust manifold box and connected to the upper portion of the outer periphery of said turbine housing.

4. A motorcycle as set forth in claim 1, wherein said motorcycle further comprises a pair of pivot means spaced apart from each other in the transverse direction of said body frame to pivotally support forward ends of said pair of fork legs on said body frame, and wherein said supercharger is positioned between said pair of pivot means.

5. A motorcycle as set forth in claim 1, wherein said supercharger includes a turbine offset towards one side of said body frame with respect to the longitudinal center line of said body frame.

* * * * *